Figure 1:
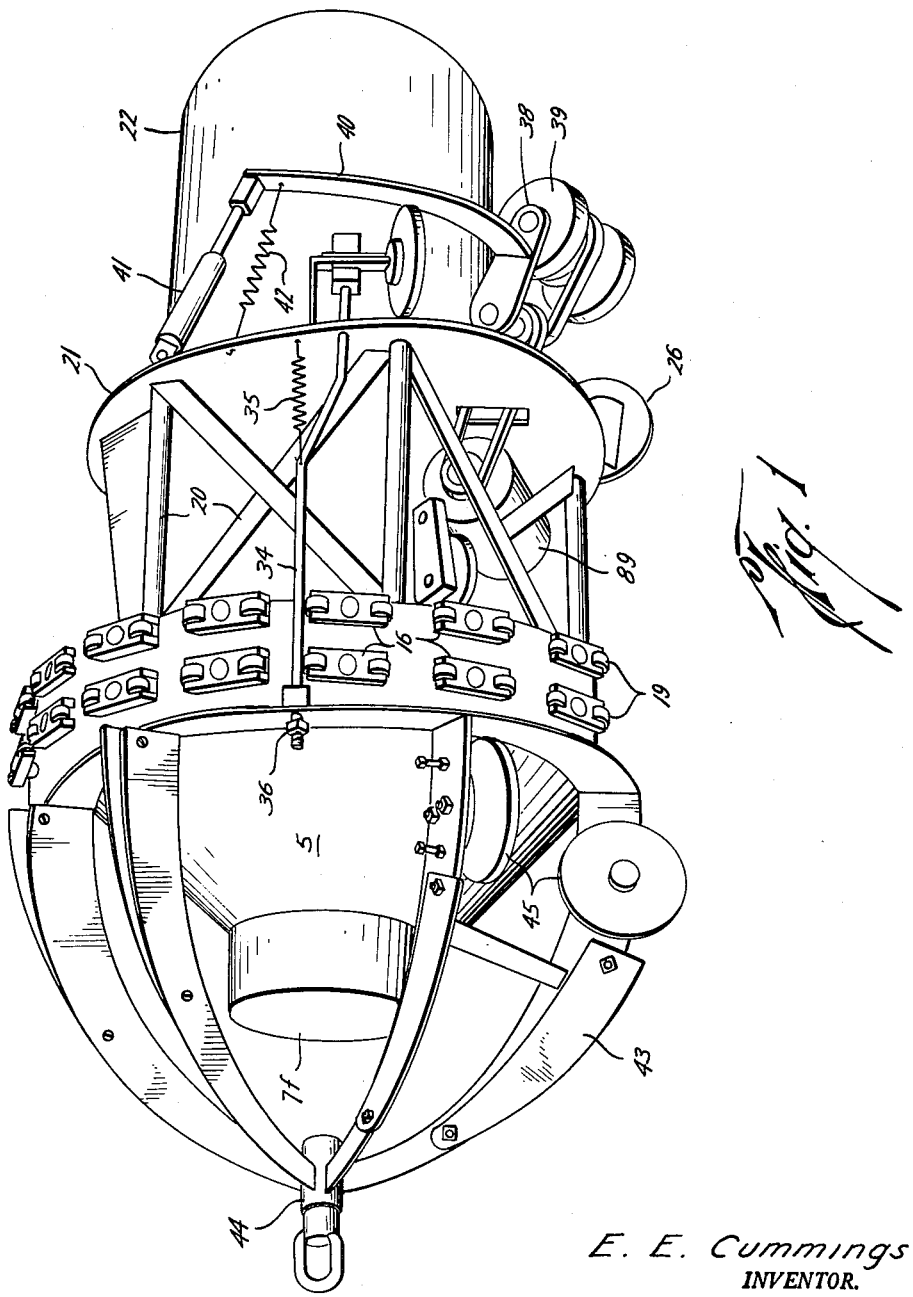

July 17, 1962     E. E. CUMMINGS     3,044,431
INTERNAL PIPE CLAMP

Filed May 16, 1960                         5 Sheets-Sheet 1

E. E. Cummings
INVENTOR.

BY G. C. Helmig

ATTORNEY

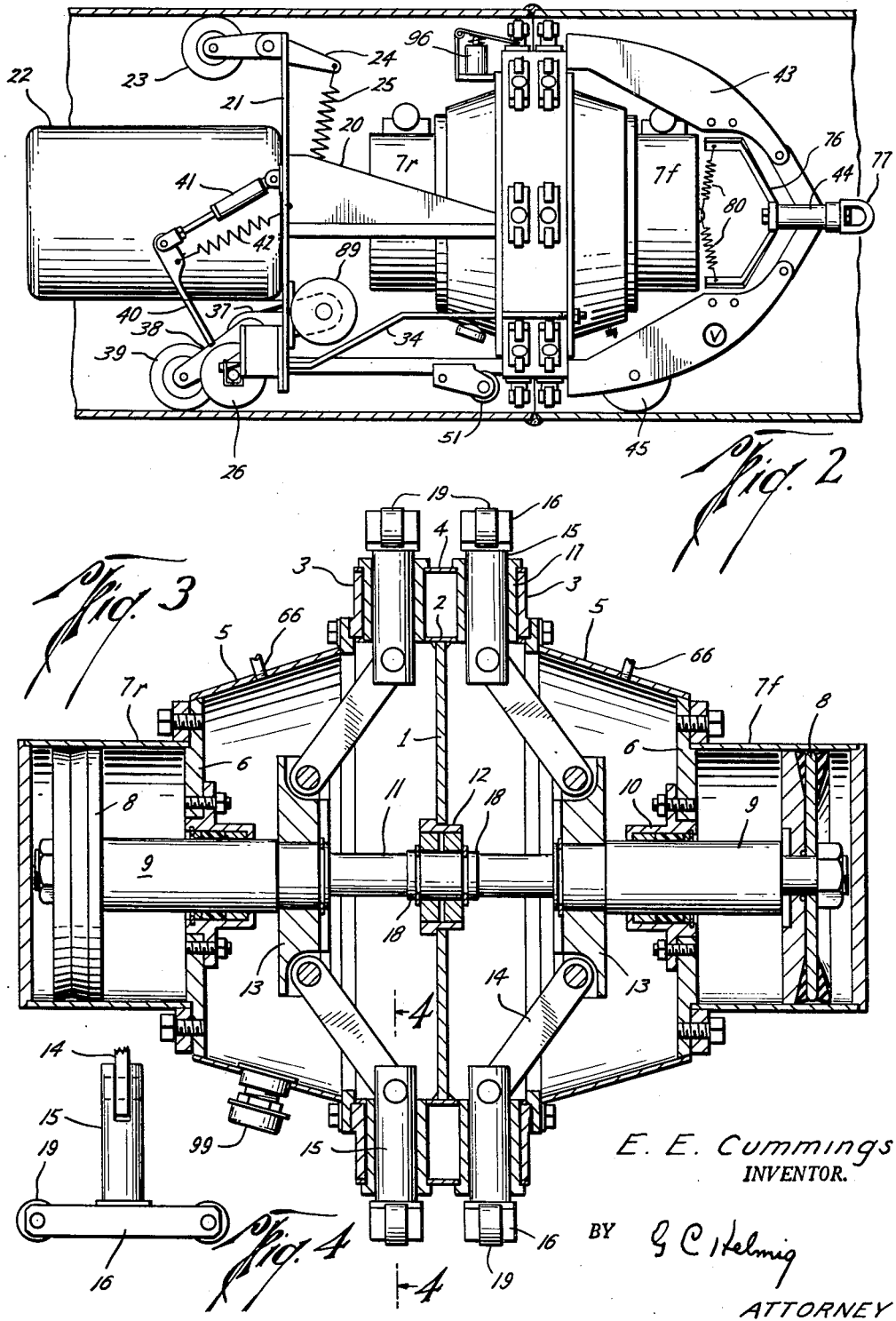

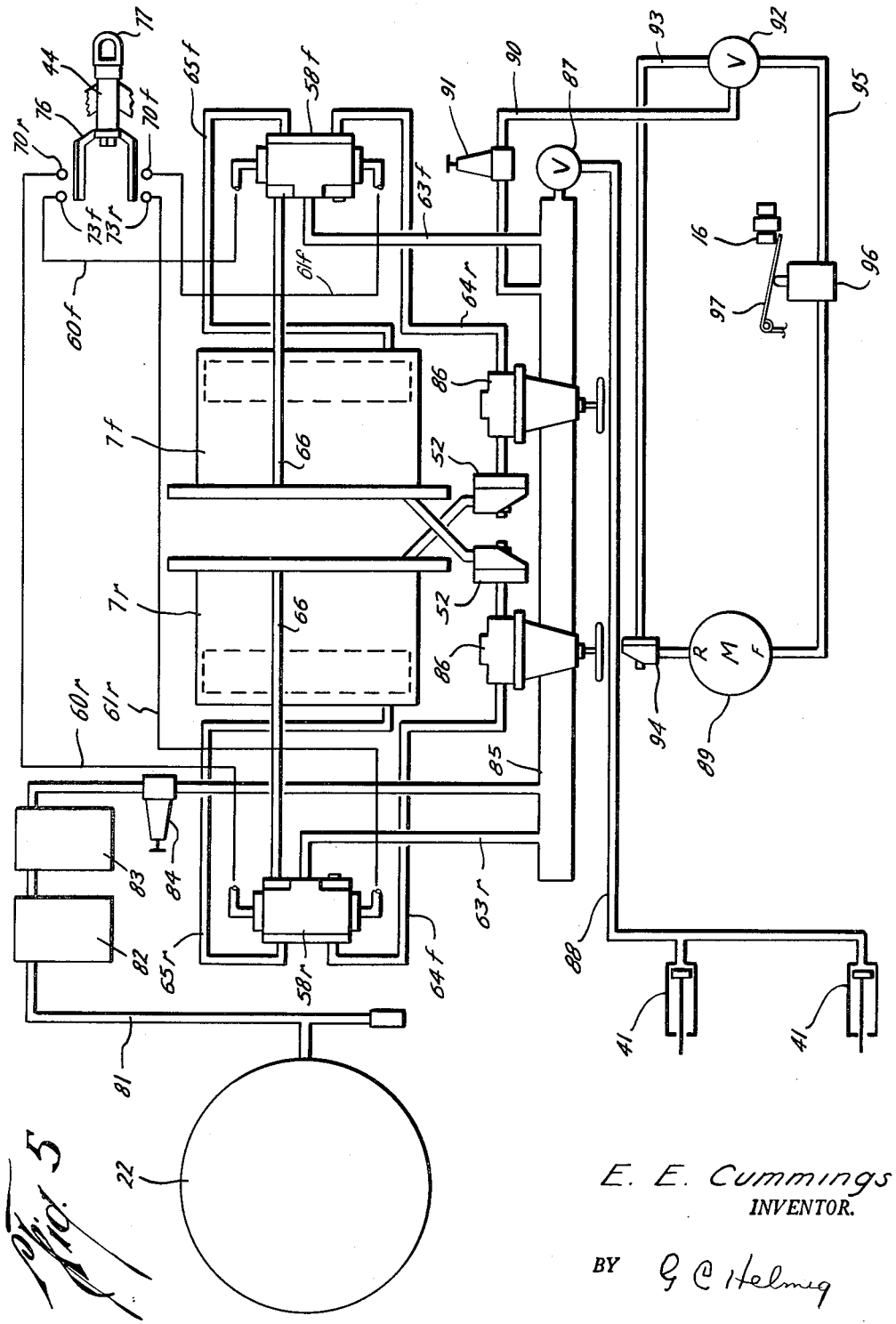

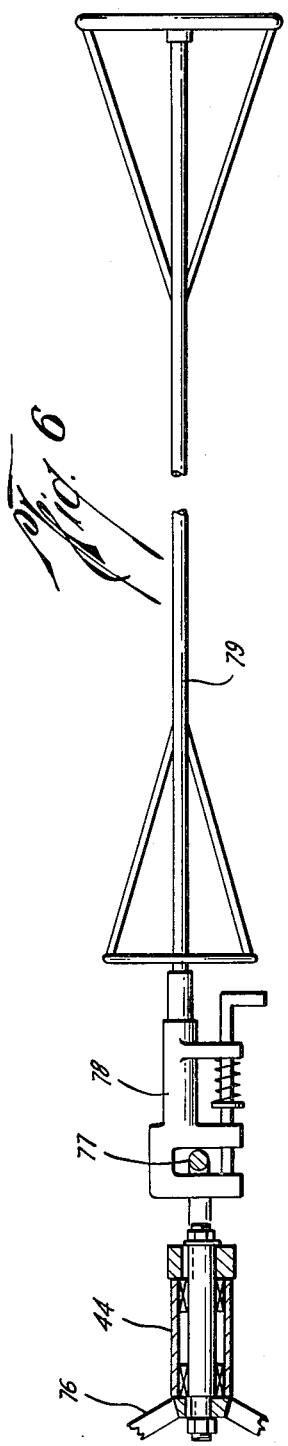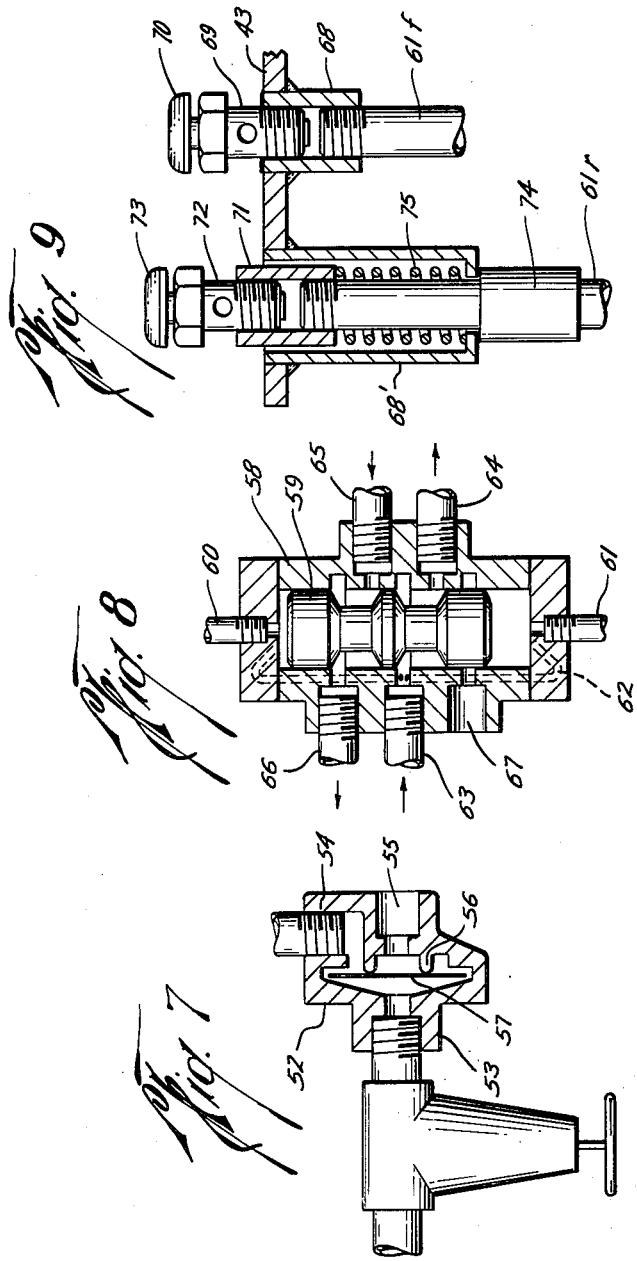
E. E. Cummings
INVENTOR.

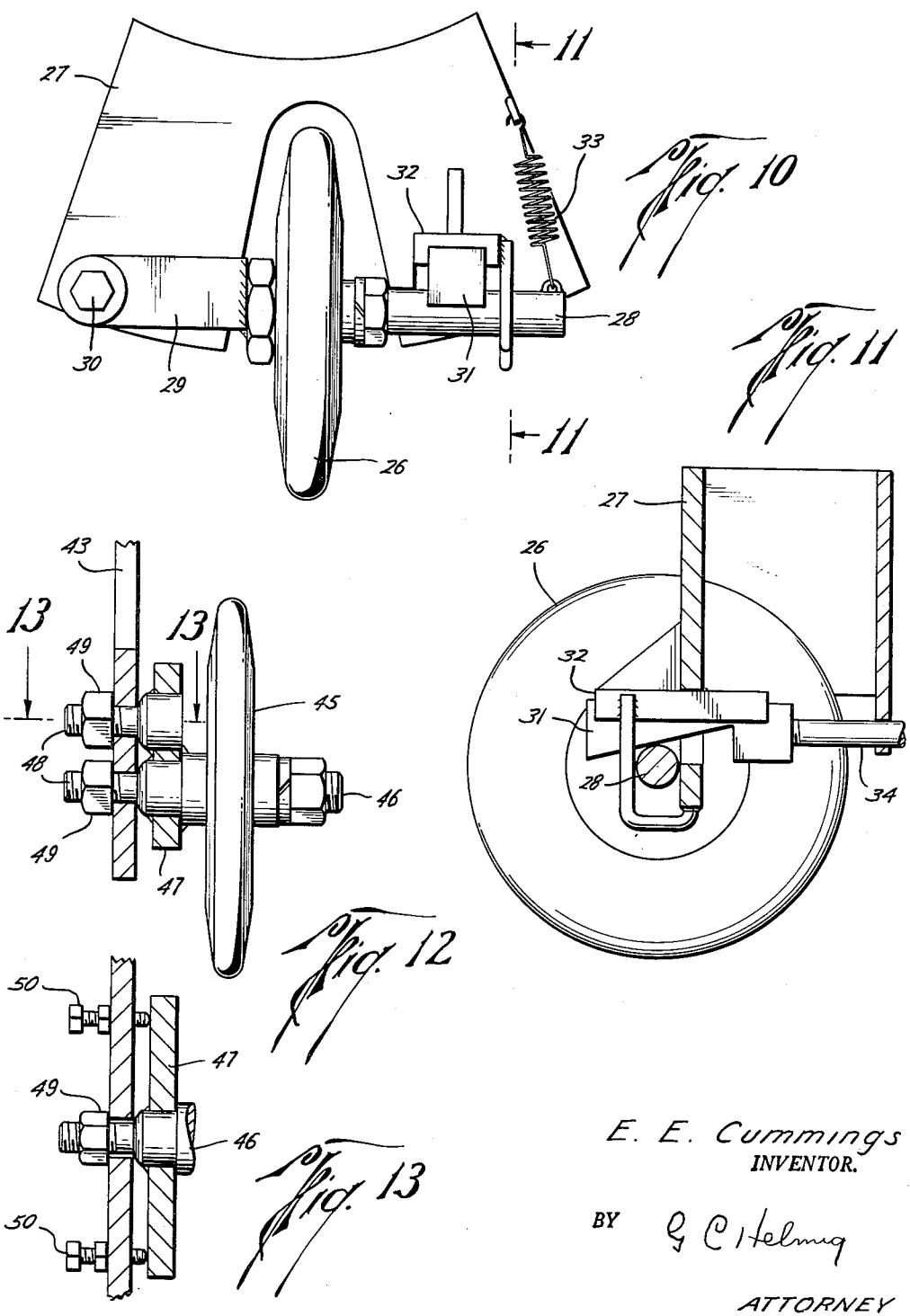

United States Patent Office 3,044,431
Patented July 17, 1962

3,044,431
INTERNAL PIPE CLAMP
Ernest E. Cummings, San Marcos, Tex., assignor to Crutcher-Rolfs-Cummings, Inc., Houston, Tex., a corporation of Texas
Filed May 16, 1960, Ser. No. 29,467
9 Claims. (Cl. 113—102)

This invention relates to internal clamps useful in aligning adjacent ends of pipes to be welded together, as commonly done at the point of installation of cross-country pipe lines.

It is an object of the invention to provide an improved clamp assembly which is easy to handle and fast in operation for greatly speeding the time required in accurately bringing pipe ends together with any needed reforming on the pipe wall to circularity and for holding aligned edges during welding together and for next shifting the assembly forward within the pipe to a new pipe end position and repetition of its work cycle.

A further object of the invention is to provide a pipe alignment fixture having longitudinally spaced apart sets of circularly and relatively closely spaced apart pipe engaging rollers rotatably mounted on parallel longitudinal axes and powered for outward radial projection in unison, first of all rollers of one set into free rolling and line bearing contact with the inside of line piping adjacent its terminal edge and then of the other set of rollers against the inside and near the adjoining edge of an incoming pipe joint after it has been brought into approximate aligned abutment with the preceding pipe end, together with controls for selective application of operating power for effecting sequential projection of the respective sets of rollers into and their subsequent retraction from pipe engagement.

Another object of the invention is to provide an improved clamp assembly embodying a valve controlled pressure fluid system having a pair of double acting pressure fluid piston motors linked by motion transmitting connections, one to one set and the other to the other set of projectable rollers and having supply and exhaust connections with opposite ends of each motor arranged for applying relatively low fluid pressure in the roller retraction stroke and relatively high fluid pressure for a forceful and fast projection and circularity restoration concurrently with the venting of the low pressure side of the motor.

A still further object of the invention is to arrange a frame assembly in the form of a hollow housing in which motion transmitting linkage is protectively enclosed against dirt and into and through which protective enclosure at least a part of the fluid pressure system exhaust passes for ventilation and elimination of moisture condensation and for depositing on and lubricating the operating mechanism with oil particles entrained within the pressure fluid.

Another object of the invention is to utilize the fluid pressure system under control of roller retraction following each pipe joining operation for transmitting drive power to a traction wheel in propelling the clamp assembly forward through the pipe.

Other objects and advantages will become apparent during the course of the following specification having reference to the accompanying drawings illustrating a preferred but not necessarily the only embodiment of the invention and wherein FIG. 1 is a perspective view looking at an angle upwardly toward the bottom and the left-hand side of the improved clamp assembly; FIG. 2 is a right side elevation of the clamp assembly positioned within a welded pipe joint with a drive traction wheel in operative position for forward travel; FIG. 3 is a longitudinal section on a larger scale of the roller mounting frame and power applying means; FIG. 4 is a detail of the roller mounting at right angles to the plane of FIG. 3; FIG. 5 is a diagrammatic representation of the pneumatic control system; FIG. 6 is a plan view with parts in section of the control mechanism for manually setting pressure system valving; FIG. 7 is a sectional view illustrating a multiple-way valve suitable for controlling pressure fluid flow to and the venting of the low pressure side of a double acting motor; FIG. 8 is a detail section of a shuttle valve associated one with each pneumatic motor; FIG. 9 is a detail sectional view of a pair of manually actuated control valves for venting air pressure at alternate ends of a shuttle valve; FIG. 10 is an end view of an adjustable mounting for a bottom and rearward load supporting roller; FIG. 11 is a view looking in the direction of the arrows on line 11—11 of FIG. 10; FIG. 12 is an end view of one of the forward load carrying rollers; and FIG. 13 is a detail section on line 13—13 of FIG. 12 and shows a simple mounting arrangement for setting toe-out positions of a pair of forward rollers for co-operation with the pipe interior surface during clamp travel in resisting clamp rotation about its longitudinal axis.

The main frame of the assembly includes a hollow housing made up, as best seen in FIG. 3, of a number of easily formed parts welded together in subassembled units and then detachably bolted to one another. A primary housing subassembly includes a central annular ring consisting of a radial web or plate 1, suitably apertured to provide communication between opposite sides thereof and peripherally welded to a cylindrical band 2 which at opposite edges are welded two radially outwardly extending side rings 3—3. At their peripheral edges the side rings 3 are welded to the opposite ends of a second cylindrical band 4 of larger diameter than the band 2 so as to be spaced radially outwardly therefrom.

Bolted to the side rings 3—3 of the central subassembly unit are a pair of oppositely tapered or frusto-conical bell housings 5 welded at their smaller ends to transverse walls 6—6. Bolted to the end walls 6—6 in longitudinal coaxial relation are a pair of cylinders 7r and 7f of double acting piston motors. Within each cylinder is a slidable piston 8 fastened on the outer end of a piston rod or hollow sleeve 9 slidably mounted in the adjacent housing end wall 6 by means of a bearing and packing member 10. The two piston sleeves 9—9 are sleeved on opposite ends of a guide bearing shaft 11 whose central portion is supported by bushings within a tubular hub 12 forming a part of the transverse web 1.

Each piston sleeve 9 has fixed on the end thereof within the hollow housing, a spider 13 carrying a number of circularly spaced apart pivot pins for connecting the inner ends of motion transmitting or expander shackle links 14 and the outer end of each link is pivotally joined and fitted to the slotted inner end of a radially disposed upright leg 15 of a T-shaped plunger whose crossbar or terminal head 16 is outside and extends generally in the direction of circularity of the housing. The radial plunger leg 15 is slidably fitted within a bushing sleeve 17 fixed within openings through the concentric cylindrical walls 2 and 4 of the annular ring subassembly unit.

In the plunger retracted position of the parts as seen in FIG. 3, the several shackle links extend angularly between the plungers and the central spiders and the fluid pressure responsive pistons are fully retracted. Upon the application of fluid pressure behind either piston to slide the same inwardly toward the web 1, force will be be transmitted through the connecting shackle links 14 for outwardly projecting in unison all of the plungers linked to the piston rod and the angularity of the links will decrease as piston travel proceeds, with an ever increasing mechanical advantage to the end of the piston stroke, at which time the links will yield maximum power multiplication and be just short of a fully straightened out or dead center relation. To prevent an overcenter condition, the guide shaft 11 is provided adjacent its centralized support with stop shoulders 18 for piston sleeve abutment to limit their expander strokes.

The respective pneumatic motors are selectively actuatable and in the operation of aligning a pair of pipe ends and after the rearward set of plungers are properly located with reference to the free edge of the first pipe, they are projected outwardly against the pipe wall interior surface and then the new joint or length of pipe is manipulated into approximate end to end alignment, whereupon it is engaged by and upon expansion of the foremost set of plungers for insuring centralized alignment.

Each plunger of both longitudinally spaced apart sets has its crossbar 16 extending on both sides of the radial pin 15 and in the direction of circularity of the assembly. Preferably, the crossbar is formed separately from the upright leg 15 and is nonrotatably fitted or keyed to a reduced diameter terminal pin portion of the upright leg and is secured thereto by a countersunk cap screw. At opposite ends of each crossbar are a pair of axle shafts disposed on parallel longitudinal axes for mounting freely rotatable rollers 19 whose peripheral tread portions project outwardly beyond the plunger crossbar 16 for roller line contact bearing with the interior pipe surface. The roller carrying crossbars in each set of longitudinally spaced plungers provide a circular succession of link interconnected segments for contraction and expansion in unison and they are of such circular length and spacing that the several rollers when outwardly projected into pipe surface contact are substantially equally annularly spaced apart. The number of expanding plungers and rollers in each set will be dictated by pipe diameters and by way of example, a clamp for use with thin walled steel pipe of thirty-inch diameter will perform satisfactorily with fifteen plungers angularly spaced apart twenty-four degrees and which will provide a total of thirty rollers in each set whose spaced apart relation will be slightly more than three inches.

In the event the wall of the pipe has become dented or somewhat out-of-round during storage, transit and handling, the simultaneous move-out of all plungers will result in roller contact initially by only a few rollers and with only the inwardly dented wall portions and expansion force will be concentrated in such regions for a wall reformation to round outline until all rollers are exerting outward pressure equally. During such reformation, there will be a tendency for the tensioned pipe wall to shift, stretch or creep at individual roller line contact and such creepage encounters a lack of frictional drag resistance by reason of free individual roller rotation and a rocking of the roller tread on the shifting pipe surface. With elimination of interface grip on pipe wall area and scraping drag, there will also be eliminated surface galling and scoring of the smooth interior wall. Pipes are usually coated internally with a resin paint to prevent corrosion and provide a smooth surface. Surface smoothness is of immense importance in a fluid transmission pipe line not only for avoiding incipient cracks and fractures as well as damage to protective coatings, but also in minimizing resistance to fluid flow transmission and travel of clean-out pigs.

A further advantage of rotational bearing engagement by the aligned clamp with a pair of pipe ends that have been brought together is obtained when relative rotation of the adjoining pipes must be made prior to the final weldment of the pipe ends. Such rotational adjustment may be needed, for example, to locate the pipe seam uppermost as usually is specified, inasmuch as blowouts are most likely in the weld weakened wall and top access for repair is least costly. Also, if the incoming pipe contains a bend, either horizontally or vertically, its angular line can be shifted by rotation and any such rotational adjustment can be accomplished with a minimum of effort and without clamp contraction and resetting but while both sets of clamping rolls are expanded, since relative rotation of pipe ends is readily accommodated by the pipe engaging and free acting rollers.

Welded to the rearmost side plate 3 are rearwardly projecting framing members including stiffening plates and diagonal bars, as shown at 20 in FIG. 1, supporting a transverse framing plate 21 as a mounting for an air pressure storage tank 22. This storage chamber can be charged periodically with pressure air from a suitable source between successive operations. Also mounted on this plate 21 are a series of pipe engaging locating rollers. Included among the rollers is a roller 23 mounted by a swinging lever 24 pivoted in the plate 21 and having a compression spring 25 acting thereon to bias the roller 23 outwardly into rolling contact with the under side of the top wall of a line pipe. One or more bottom rollers 26 spaced apart on opposite sides of the vertical center line of the assembly, are also mounted by the plate 21, each by means of a bracket 27 welded to the plate.

The axial shaft 28 on which each lower roller 26 is rotatably mounted has a forked end 29 secured to the bracket 27 by a longitudinal pivot pin 30 and the oppositely extended end of the shaft 28 is received within a vertically elongated slot and bears upwardly on a downwardly and rearwardly inclined surface of a wedge 31 whose upper edge has slide bearing within an inverted U-shaped shoe 32 fixed on the bracket. The frame load can thus be transmitted through the axle and the roller when the latter is in contact with the pipe wall. A coil spring 33 connected at opposite ends to the free end of the shaft 28 and to the frame bracket 27 biases the shaft into engagement with the wedge 31. This wedge 31 if adjusted to and fro will vary the limit of vertical travel of the shaft 28 about its pivot mounting 30. For controlling such adjustment, the wedge 31 has an internally threaded forward head for securement of the rearward end of a longitudinal rod 34 which, as best seen in FIG. 1, is biased rearwardly by a coil spring 35 and rearward rod movement is limited by abutment with the housing frame of an adjustable nut 36 on the front end of the rod 34.

Also projected rearwardly from the mounting plate 21 is a support bracket 37 for a transverse shaft carrying a pivoted link or links 38 whose free ends rotatably carry a pair of traction wheels 39 having rubber tread surfaces and being adapted for drive contact on the interior of the pipe wall beneath the clamp assembly and in the central region thereof. These traction wheels 39 can be moved into and out of tracking engagement with the pipe by a vertically swinging adjustment of the pivoted lever links 38 about its pivot shaft mounting in the bracket 37.

For such purpose, one or both of the links 38 have an arcuate and upwardly extending arm 40 joined at its upper end to a piston and cylinder motor 41 which can be supplied with air under pressure to project the piston for swinging the traction wheels downwardly. Conveniently, the opposite ends of the motor 41 are pivotally connected to the frame plate 21 and to the lever arm 40. For raising the wheel in the absence of the application of pressure air at the motor 41, a coiled tension spring 42 has its opposite ends connected to the frame plate 21 and the lever arm 40 and yieldably biases the arm in the direction opposite to applied motor force.

Projecting forwardly from the foremost framing ring 3 are a series of circularly spaced apart and inwardly curved nose pieces or rails 43 which meet at their forward ends by joinder to an axially extending tubular sleeve 44. Two of such nose rails 43 in spaced apart relation on opposite sides of the vertical central plane and near the bottom of the assembly have adjustable axles for rotatably mounting a pair of load supporting wheels 45—45. Each wheel 45, as best seen in FIGS. 12 and 13, has its hub on an axle shaft 46 whose inner end is welded to a plate 47 from the opposite side of which project a pair of vertically spaced apart screw studs 48 to fit loosely within openings in the adjacent nose rail 43. Adjustable nuts 49 on the studs 48 co-operate with the stud heads for securing the plate 47 rigidly to the mounting rail 43 and in selected positions of toe-out adjustment. For setting toe-out adjustment, set screws 50—50 adjustably threadedly mounted in the rail 43 forwardly and rearwardly of the studs 48 make contact with the wheel mounting plate 47 and by their relative adjustment when the fastening studs 49 are loosened, will serve to set the toe-out relation of the wheel 45 in relation to its companion wheel 45. Such toe-out of the wheels is effective during travel of the assembly through previously welded pipe when the wheels 45 ride on the curved lower portion of the pipe wall with the wheels coacting to hold the frame moving in a straight line and against any tendency to assume an upside down position.

One or more additional and supplementary rollers 51 are bracketed beneath the frame and immediately rearwardly from the central region supporting the expansible plungers. Such supplemental rollers 51 are out of action during normal forward travel of the frame on the wheels 45 and the traction wheels 39 except in the last increment of movement wherein the forward wheels 45 pass out of the open end of the pipe. Immediately that happens, the transversely spaced apart rollers 51 engage the pipe wall to support the forward end of the frame assembly.

The pneumatic control of the operating mechanism is diagrammed in FIG. 5 and involves various units of more or less conventional structure including pressure responsive valves as well as manually operable valves. Before referring in detail to the diagram, it will be helpful to comment briefly on the control valving. Thus one type of the pressure responsive valve, as shown in FIG. 7, involves a hollow housing 52 having a coupling boss 53 for connection to an air pressure supply line; a coupling boss 54 for connection to a pneumatic device to be controlled; and a vent port 55. Within the hollow body is an annular valve seat 56 to control the vent port 55 by means of a shiftable wafer or disc 57 shown in FIG. 7 as being in vent closing position, whereby pressure air supplied to the coupling 53 will move through given clearance around the rim of the disc 57 and pass outwardly to the coupling 54. In the event the upstream supply of pressure air is cut off, then differential pressures, with the dominant pressure at the coupling 54, will tend to unseat the disc 57 for quickly exhausting or venting the inside of the valve body.

FIG. 8 shows a valve housing 58 containing a spool type valve 59 which can be shuttled back and forth in response to differential pressure on opposite ends of the spool body 59. These opposite ends have pipe connections into the valve chamber, as indicated at 60 and 61, which will be controlled by suitable valving for the relief of pressure. Air under pressure is metered to opposite ends of the housing by small passages 62 formed in a wall of the valve housing 58 for communicating each end with a source of air under pressure as supplied by a pipe connection 63. Relatives sizes of passages to venting through pipes 60 and 61 and from supply through ports 62 is controlled for faster relief than entry of air.

In the spool position illustrated, pressure air, as shown by arrows, is directed from the supply line 63 across the spool and into a conduit connection 64. A similar conduit connection 65 communicates through the valve with a pipe connection 66 for exhaust purposes. Once the shuttle valve has moved to any given position, it will remain there so long as pressures on opposite ends of the spool are balanced. Thus, as viewed in FIG. 8, should the relief pipe connection 61 be opened to atmosphere while the connection 60 is closed, then the spool will shift from the position shown to a position in which the exhaust passage 66 is closed and pressure air from the supply 63 passes into the line 65 while the line 64 is exhausted to atmosphere through a previously closed vent port 67.

The shuttle valve referred to is to be used for controlling the plunger expanding motors, there being one valve for each motor 7r and 7f. This will mean that there are two exhaust conduits, such as at 60, and two exhaust conduits, such as shown at 61 in FIG. 8, and each of the four conduits will require a vent valve. It is here proposed to provide two sets of vent valves in spaced apart relation, as seen in the FIG. 5 diagram, and each set of valves can be arranged to operate as seen in FIG. 9.

Referring to FIG. 9, both valves are mounted in side by side longitudinal alignment on one of the nose rails 43 by means of tubular sleeves 68 and 68'. The sleeve 68 is threaded at opposite ends to receive the terminal of the flexible hose 61f and to receive a button type vent valve 69. Its button 70 when depressed will vent the hose 61f to atmosphere. The mounting sleeve 69 slidably receives a coupling sleeve 71 joining a vent valve 72 having a control button 73, with a coupling extension 74 of a flexible hose 61r. A coil spring 75 is interposed under compression between a bottom flange of the mounting sleeve 68' and the coupling sleeve 71 and yieldably pushes upwardly on the sleeve 71 for seating a lateral shoulder of coupling 74 against the sleeve 68'. By this arrangement, the operating button 70 is below the button 73 of the companion valve, so that a common operating lever may be used whose depression will first make bearing contact with the button 73 to vent the hose line 61r and thereafter further downward movement of the control lever will continue to hold the valve 72 open while compressing the spring 75 and then come into engagement with and depress the control button 70 of the valve 69 for venting the line 61f.

The lever for controlling the vent valves is in the nature of a double armed yoke or fork 76, one arm of which controls one set of valves and the other of which controls the other set of valves, and the yoke 76 is made fast on a short shaft rotatably mounted in the bushing 44 and terminated in an eye 77 by which the yoke can be oscillated. Such oscillation is controlled by a detachable hook 78 (see FIG. 6) on the rearward end of a long handle or rod 79 of a length to extend to and slightly beyond the forward end of an incoming pipe joint. The handle can be rocked either clockwise or counterclockwise to depress the arms of the yoke 76 against a pair of centering springs 80 (see FIG. 2) which normally hold both arms upwardly away from the valve buttons.

Referring now to the FIG. 5 diagram, the supply of pressure air periodically charged into the storage tank 22 will be maintained between two hundred pounds and five hundred pounds. A delivery line 81 leads from the storage tank 22 and through an air cleaner 82, an oiler 83 and a pressure regulator 84 to a manifold 85. The oiler 83 is of a conventional type for the entrainment of small quantities of oil particles in the pressure air stream for lubrication of downstream units and the regulator 84 will control pressure downstream thereof to a suitable value, as, for example, one hundred fifty pounds per square inch. From the manifold 85 a delivery line 63r leads to a shuttle valve unit 58r and another delivery line 63f leads to a similar shuttle valve unit 58f. A pressure line 65r leads from the valve 58r into the plunger projecting cylinder 7r to supply energy for projecting the rearward set of plungers. For projecting the forward set of plungers, the forward motor 7f has a pressure supply conduit 65f connected with the control valve 58f. The piston retracting side of the motor 7f is connected with a conduit 64f to the shuttle valve 58r and similarly a conduit 64r joins the retracting pressure side of the motor 7r with the shuttle valve 58f. Each of the conduits 64f and 64r contains a pressure regulator 86 for a relative reduction of pressure to approximately fifty pounds, and also a quick exhaust type valve shown in FIG. 7 and numbered 52. Opposite sides of the shuttle valve 58r are joined by vent lines 60r and 61r to oppositely disposed vent valves 70r and 73r and the remaining vent valves 73f and 70f are joined by vent lines 60f and 61f to opposite sides of the shuttle valve assembly 58f.

Through the valvings thus far described, the pipe engaging elements of the two sets can be selectively and individually projected and retracted and in use the clamp, upon being positioned at the forward end of a pipe line, will be actuated by supplying pressure air first to the motor 7r for moving its piston forwardly and projecting the plungers against the pipe wall adjoining its free edge. This can be by finger pressure directly on the button 73r. Thereafter and as soon as the next succeeding pipe joint is brought into approximate end to end alignment with the preceding joint, the button 70f can be depressed, as by means of the handle 79, and pressure will be supplied to move rearwardly the piston within the motor 7f for projecting the forward set of plungers into pipe wall engagement. The pressure thus applied will be on the order of one hundred fifty pounds as controlled by the regulator 84 and against the opposing fifty pounds pressure beyond the reducer or regulators 86. To facilitate quick response with minimum resistance on the opposite side of the piston, the quick release valves 52 will act to relieve pressure independently of the venting of the hose lines 64f and 64r through the respective shuttle valves. If for any reason it is desirable to retract the foremost set of plungers, this may be done through actuation of the vent valve 73f for restoring the initial position of the shuttle valve 58f and which vent valve will be the higher of the two valves, as seen in FIG. 9. The same height difference applies to both sets of vent valves, so that the forked levers 76 first engage the highest set of valves, either to sequentially operate the pistons for first projecting the rearward set of plungers and for first retracting the forward set of plungers. For retraction of both sets of plungers at one time, the fork 76 is swung clockwise in one action to depress both buttons 73f and 70r.

The conditioning treatment of pressure air by dust removal at the cleaner 82 and by entrainment of oil particles introduced into the upper stream at the oiler 83 serves to minimize abrasive wear and to adequately lubricate the various moving parts internally of the pressure system. In addition, the exhaust lines 66 associated with the valves 58r and 58f are in open communication with the interior of the enclosed housing frame and, as seen in FIG. 3, the housing frame has a protective breather device 99 leading to atmosphere. Accordingly, the exhaust of oil laden air through the frame housing serves to ventilate the housing and eliminate condensation problems, and additionally provides lubrication for the moving parts including the pivoted and reciprocatory slide surfaces. Accordingly, enclosed parts are not only protected against dirt and dust accumulations which aggravate wear, but also against moisture corrosion difficulties. This tends to keep all the enclosed parts covered with a film of oil for greatly prolonging life and eliminating need for frequent service maintenance attention.

A hand valve 87 is disposed in a conduit 88 connecting the manifold 85 with the traction wheel positioning motors 41. This allows the traction wheels to be retracted after the clamp assembly is in position for the initial projection of the rearward set of plungers and again to be brought back into engagement with the pipe after the initial centering operation has been completed. In the absence of traction drive power transmitted to the wheels 39, they will serve to provide a certain amount of braking action on the pipe in transferring the clamp from one position to another as will be helpful to control travel speed when pipe is being installed on a downgrade and clamp travel is by manual effort on the long handle 79. On the other hand, for either uphill or level country, travel can be induced by power transmitted through suitable chain drives to the traction wheels from an air motor 89 mounted on the framing ring 21, as seen in FIG. 2. This motor will provide either forward or reverse drive. As will be further discussed, forward drive following completion of a welding operation will move the clamp assembly to the forward end of the pipe line, at which point a control valve 92 is accessible for manual manipulation to stop further travel. Thereafter and in advance of and in preparation for positioning the next joint of pipe in end to end relation to the pipe line, the control valve 92 can be manually operated to shift the clamp assembly back and forth as needed for positioning the rearward set of plungers relative to the pipe terminal next to be engaged. Pressure air from the manifold 85 can be fed to a line conduit or hose 90 containing a pressure regulator 91 for suitably reducing the air pressure downstream thereof to approximately thirty-five pounds and controlled for feed to the motor 89 by a multiple-way hand valve 92 mounted on one of the nose rails 43. When the hand valve 92 is set for reversing the motor, the pressure air will be conducted through a conduit 93 containing a quick dump valve 94 corresponding to the valves 52 previously referred to. A quick dump of pressure is desirable inasmuch as reverse movement of the frame is usually in a succession of spurts, each of extremely short duration. After the assembly has been initially centered, or, in other words, when the rearmost set of plungers has been projected and before the incoming pipe joint is swung into overlapping relation with the forwardly projecting frame nose, the manual valve 92 will be adjusted for pressuring a conduit 95 leading to the forward drive side of the motor 89 but containing in series with the valve 92, a supplementary control valve 96 which in response to projection of the rearward set of plungers, is closed against delivery of air to the motor. This valve 96 has an actuating stem projecting outwardly for engagement by a pivoted lever 97 whose free end will be in the path of one of the plungers 16 of the rearward set of plungers, so that after plunger projection the valve 92 is opened but the companion valve 96 will remain closed so long as the plungers are projected. In response to plunger retraction the actuating lever 97 will be swung to valve opening position for automatically effecting traction wheel drive upon completion of the welding operation and following release in succession of the forward and rearward centering plungers. With contraction of the plungers of the rearward set, the forward load carrying and toed out wheels 45 will rest in spaced apart relation on the curved wall surface and with the traction wheels 39 depressed and driven from the motors, the clamp assembly will move forward until the valve 92 is actuated by a workman positioned to control the same as it comes within his reach at the front end of the pipe. Repetition of the clamp operational cycle is then in order.

What is claimed is:

1. In a clamp to engage internally with and align adjoining ends of a pair of pipes, a housing having a chamber enclosing wall, a chamber pressure vent in said wall, two sets of separate outwardly expansible pipe engaging devices projecting through the housing wall for engagement respectively with adjacent pipe ends, a pair of pneumatic motors mounted on the housing, motion transmitting connections within the housing chamber joining one motor with one set of pipe engaging devices and joining the other motor to the other set of pipe engaging devices for selective actuation, means supplying motor operating pressure fluid containing oil particles, flow connections joining the supply means with both motors and joining both motors for exhaust therefrom to the interior of the housing chamber and flow control valving in said connections selectively operable in controlling pressure fluid supply individually to the respective motors and the individual exhaust therefrom.

2. In an internal line-up clamp, a hollow housing supporting and protectively enclosing operating mechanism and being closed except for pressure vent means, radially expansible pipe engaging devices projecting outwardly through the wall of said housing, a pneumatic motor joined to said devices inside said housing by motion transmitting connections constituting said operating mechanism, a source of pressure air, flow conduits serially connecting said source of pressure air, the pneumatic motor and the interior of said housing, valving in said conduits controlling air flow sequentially from said source to said motor and from the motor to said housing and means to introduce oil particles into the air for lubrication of the valve, the motor and the motion transmitting connections.

3. In an internal line-up clamp, a hollow housing supporting and protectively enclosing operating mechanism and being closed except for pressure vent means, radially expansible pipe engaging devices projecting outwardly through the wall of said housing, a pneumatic motor joined to said devices inside said housing by motion transmitting connections constituting said operating mechanism and pressure fluid connections leading to and from said pneumatic motor for supplying and exhausting operating fluid to and from said pneumatic motor and including flow control valving in said connections controlling fluid flow to and from said pneumatic motor, a source of pressure fluid having a fluid delivery conduit connected with the control valving for controlled communication therethrough with said pneumatic motor, means for introducing oil particles into the fluid flow through said delivery conduit from said source under control of the control valving and a conduit connecting said control valving with the housing and discharging pressure fluid exhausted from said pneumatic motor through said control valving and into the housing interior.

4. In an internal pipe clamp for aligning adjacent pipe ends to be joined, a hollow housing, load supporting rollers secured to the housing to bear on the pipe, radially expansible pipe engaging devices projecting outwardly through the wall of the housing, a pneumatic motor having operating connections inside the housing with said devices for the application of outward pressure thereon into pipe clamping engagement which centers the housing and removes the load thereof from the rollers, a source of pressure fluid, means to introduce oil particles into the fluid of said source, valving means selectively communicating the pressure source with the motor for the outward expansion of said devices and communicating the motor with the interior of the housing for pressure fluid exhaust and retraction of said devices, a second pneumatic motor having roller traction drive connection, flow connections joining said pressure fluid source with said second pneumatic motor and containing a pair of flow control valves in series, means mounting one of the valves adjacent the front of the clamp for manual actuation and an actuator connected with the other valve and operatively related with one of said pipe engaging devices for movement therewith between an open position when the device is retracted and a closed position when the device is expanded.

5. In an internal pipe clamp for aligning adjoining pipe ends to be joined, a series of circularly spaced expansible pipe engaging devices, a support therefor, a pneumatic motor connected with the devices to project and retract the same, a source of actuating pressure fluid, valving controlling the application of pressure fluid from said source to the motor for the selective projection and retraction of said pipe engaging devices, a traction roller mounted on the support for pipe traction engagement, a pneumatic drive motor having transmission coupling with the roller and a valved connection joining the pressure fluid source with the drive motor and including manually operable means controlling the connection and connection controlling means in series with said manually operable means and responsive to the projection and retraction respectively of said devices to shut off and supply pressure fluid to the drive motor.

6. In an internal pipe clamp as in claim 5, means mounting the traction roller for projection and retraction to and from pipe engaging position, a fluid pressure actuated device joined to the roller mounting means and operable to project the roller into traction contact with the pipe and means supplying said last mentioned device with pressure fluid.

7. The clamp as in claim 6 wherein said fluid actuated pressure device receives pressure fluid to project the traction roller in advance of the transmission thereto of drive from the drive motor.

8. In an internal pipe line-up clamp assembly, a supporting frame, radially expansible pipe clamping members carried by the frame, force applying means active on the members to move than between a contracted position and an expanded pipe engaging and centering relation, forward and rearward load supporting rollers carried by the frame to track on the pipe when the frame is out of center relation with the clamping members in retracted position, a transverse axle for a rearward roller, axle locating means on the frame having a vertically elongated axle receiving slot and a longitudinally adjustable reciprocable rod having means to lock it in selected positions of longitudinal adjustment in the frame and having an axle abutment surface downwardly engaged with the axle and inclined to the horizontal frame center line for setting the vertical position of the axle in its receiving slot.

9. In an internal pipe clamp, a main frame having expansible pipe engaging members, pressure appling means connected to said members for expanding the same for centralizing adjoining pipe ends and said frame therein, a series of circumferentially spaced apart bearing elements carried by the main frame for pipe engagement at circularly spaced apart regions when said pipe engaging members are retracted and active by such engagement to center the main frame within the pipe an outwardly projectable pipe engageable traction roller mounted at the rear of the frame and having means active thereon to bias the traction roller inwardly of the frame to a normal position out of traction engagement with the pipe, power driven motor means operative to overcome said biasing means and project the traction roller outwardly for pipe engagement, a second power driven motor having traction driven transmitting connection with the roller, a source of power and selectively operable means controlling the flow of power from said source to both motors and constructed and arranged for actuating the roller projecting motor independently of actuation of the drive motor.

References Cited in the file of this patent
UNITED STATES PATENTS

| | | |
|---|---|---|
| 2,430,273 | Browning | Nov. 4, 1947 |
| 2,594,000 | Elliott | Apr. 22, 1952 |
| 2,638,069 | Mearns | May 12, 1953 |
| 2,640,561 | McGushin | June 2, 1953 |
| 2,804,836 | Tiedemann | Sept. 3, 1957 |
| 2,830,551 | Miller | Apr. 15, 1958 |
| 2,906,226 | Myrick et al. | Sept. 29, 1959 |
| 2,936,020 | Thornburg et al. | May 10, 1960 |